(12) United States Patent
Hara et al.

(10) Patent No.: US 8,438,477 B2
(45) Date of Patent: May 7, 2013

(54) METHODS FOR DEFORMING MAP WIDGETS ON THE BROWSER

(75) Inventors: Masao Hara, Kanagawa (JP); Motoharu Inoue, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1046 days.

(21) Appl. No.: 11/951,519

(22) Filed: Dec. 6, 2007

(65) Prior Publication Data

US 2009/0150757 A1 Jun. 11, 2009

(51) Int. Cl.
*G06F 17/00* (2006.01)

(52) U.S. Cl.
USPC ............ 715/273; 715/243; 715/247; 715/252

(58) Field of Classification Search .................. 715/243, 715/247, 25, 273, 252
See application file for complete search history.

(56) References Cited

U.S. PATENT DOCUMENTS

| | | | | |
|---|---|---|---|---|
| 4,790,028 A * | 12/1988 | Ramage | ........................ | 382/298 |
| 6,037,939 A * | 3/2000 | Kashiwagi et al. | ............ | 715/798 |
| 6,073,036 A * | 6/2000 | Heikkinen et al. | ......... | 455/550.1 |
| 6,215,491 B1 * | 4/2001 | Gould | ........................... | 345/660 |
| 6,487,305 B2 * | 11/2002 | Kambe et al. | .................. | 382/113 |
| 6,535,233 B1 * | 3/2003 | Smith | ......................... | 715/856 |
| 7,034,832 B2 * | 4/2006 | Yamauchi et al. | ............. | 345/473 |
| 7,107,285 B2 * | 9/2006 | von Kaenel et al. | .................. | 1/1 |
| 7,450,114 B2 * | 11/2008 | Anwar | ......................... | 345/179 |
| 7,555,725 B2 * | 6/2009 | Abramson et al. | ............. | 715/781 |
| 2006/0232551 A1 * | 10/2006 | Matta | ............................ | 345/156 |
| 2007/0050340 A1 * | 3/2007 | von Kaenel et al. | ............. | 707/3 |
| 2007/0268310 A1 * | 11/2007 | Dolph et al. | .................. | 345/629 |

* cited by examiner

*Primary Examiner* — Doug Hutton, Jr.
*Assistant Examiner* — Andrew Dyer
(74) *Attorney, Agent, or Firm* — Cantor Colburn LLP; Ingrid Foerster

(57) ABSTRACT

A method for displaying an image of a map using a processing system, the method including: dividing a first map image obtained from a map widget into sections wherein the first map image is displayed by the processing system; recording the location of each marker to be represented in a second map image; calculating a weight factor for each section; moving and deforming each section according to the weight factor of each section to form the second map image; placing a new marker on the second map image wherein the new marker represents at least one marker with a recorded location; and displaying the second map image in place of the first map image.

14 Claims, 8 Drawing Sheets

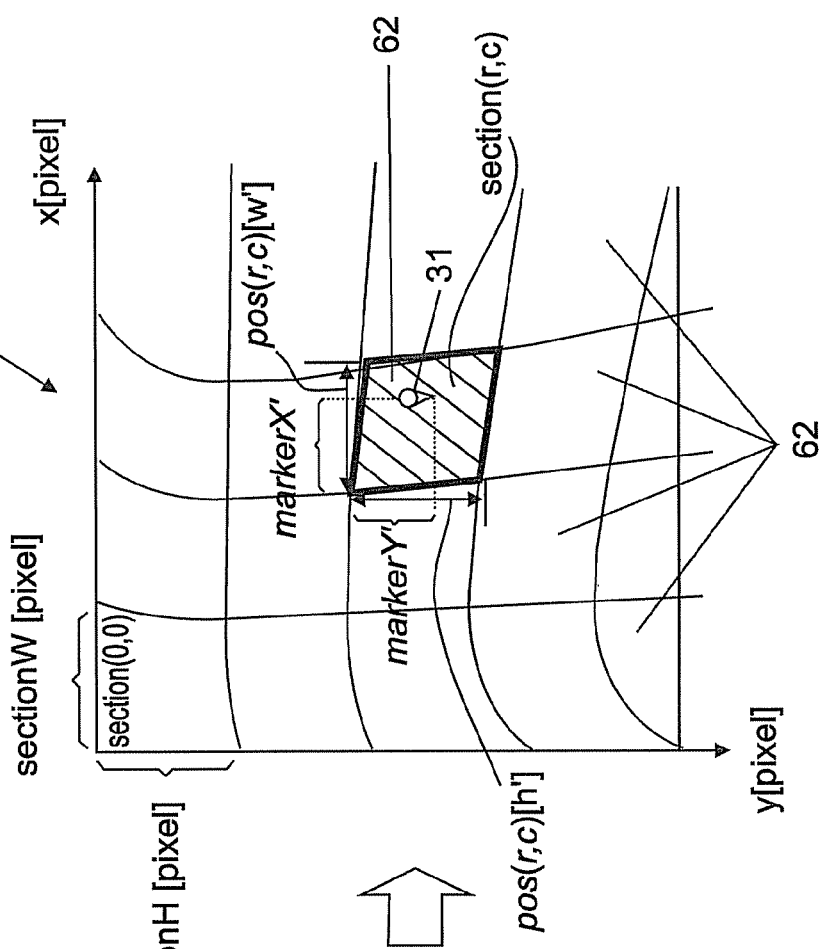
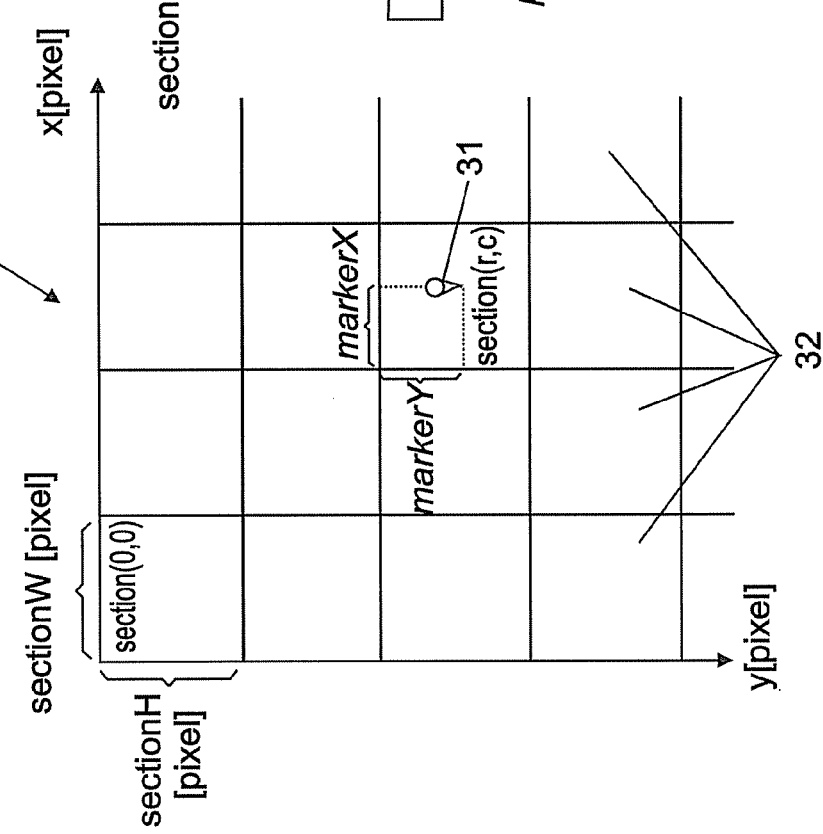

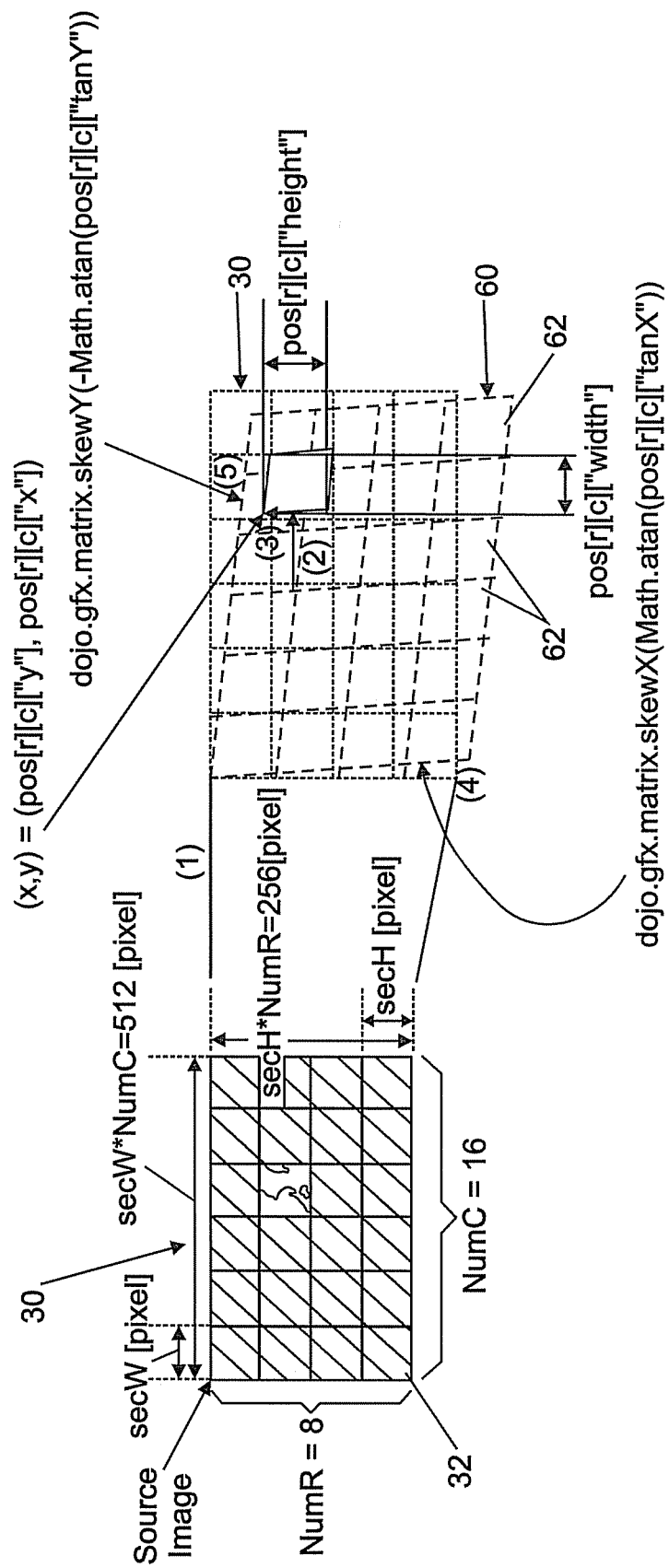

METHODS FOR DEFORMING MAP WIDGETS ON THE BROWSER

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to modifying maps received from the Internet, and particularly to modifying the maps with a browser.

2. Description of the Related Art

The World Wide Web provides many services via the Internet. These services are generally accessed using a software application referred to as a "browser." Some of the services provide a mapping feature, which may be referred to as a "map widget." One example of a map widget is GOOGLE Maps.

The map widget may present a map upon which a marker is illustrated. The marker is used to indicate a certain location on the map.

Some problems may arise when a map is displayed with more than one marker. In some situations where markers are close together on a small area of the map, the markers may overlap each other. When markers overlap each other, a false impression concerning the information presented by the markers may be created. The false impression may be created because a viewer may not be abler to discern the number of markers present at the small area of the map. In addition, information displayed on the map may be obstructed by the markers being close together.

Attempts have been made to overcome the problems stated above using available software with the browser. In one example, a chart is used to present information that would be presented by the markers. However, the chart can also obstruct details on the map such as country names and borders. In another example, color is used to convey marker information. The application of color, though, cannot be applied to maps that already have color. Also, the browser is unable to color only the land because the browser cannot find the border between sea and land.

The map image itself cannot be modified using image processing techniques in conjunction with the browser because JAVASCRIPT cannot be used with binary code.

Therefore, what are needed are techniques for illustrating a map while providing an accurate impression of the number or markers presented on the map. In addition, the map is illustrated so as to limit obscuring of information displayed on the map.

SUMMARY OF THE INVENTION

The shortcomings of the prior art are overcome and additional advantages are provided through the provision of a method for displaying an image of a map using a processing system, the method including: dividing a first map image obtained from a map widget into sections wherein the first map image is displayed by the processing system; recording the location of each marker to be represented in a second map image; calculating a weight factor for each section; moving and deforming each section according to the weight factor of each section to form the second map image; placing a new marker on the second map image wherein the new marker represents at least one marker with a recorded location; and displaying the second map image in place of the first map image.

Further disclosed is a computer program product stored on machine readable media and including machine executable instructions for displaying an image of a map using a processing system, the product including instructions for: dividing a first map image obtained from a map widget into sections wherein the first map image is displayed by the processing system; recording the location each marker to be represented in a second map image; calculating a weight factor for each section wherein the weight factor is proportional to the number of markers to be represented in each section; moving and deforming each section according to the weight factor of each section to form the second map image wherein at least one section that includes the location of at least one marker is expanded and at least one section that does not include the location of at least one marker is contracted; placing a new marker on the second map image wherein a size of the new marker is proportional to the number of markers the new marker represents; and displaying the second map image in place of the first map image.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which solves the problem of displaying a map image on a processing system wherein markers located close together result in markers overlapping each other and thereby creating an inaccurate first impression. In addition, we have achieved a solution to the problem of markers obscuring information displayed on the map image.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings, wherein like numbered elements are numbered alike, in which:

FIGS. 8A and 8B, collectively referred to as FIG. 8, illustrate aspects of transforming the map to the emphasized map;

FIG. 9 illustrates an example of transforming the map to the emphasized map.

The detailed description explains the preferred embodiments of the invention, together with advantages and features, by way of example with reference to the drawings.

DETAILED DESCRIPTION OF THE INVENTION

The teachings provide techniques for illustrating a map with at least one marker on a display of a computer processing system. In particular, the techniques illustrate the marker on the map while limiting obscuring of information on the map by the marker. The techniques provide for an accurate first impression concerning the number of markers and their location on the map.

The techniques include a method for distorting an image of the map with a browser. Specifically, the method emphasizes (by expanding) a portion of the map that includes the marker. By expanding the emphasized portion, more area of the image is available to provide information without being obscured by the marker. The method also includes de-emphasizing (by contracting) portions of the map that do not include any markers. A portion of the map between an emphasized portion and a de-emphasized portion is generally distorted to provide a smooth transition between the two portions.

In one embodiment, when there are many markers located in a small area of the map, the method may illustrate a single marker in place of the many markers. The single marker, in these instances, will have a size proportional to the number of markers for which the single marker is substituted.

Figure 1:
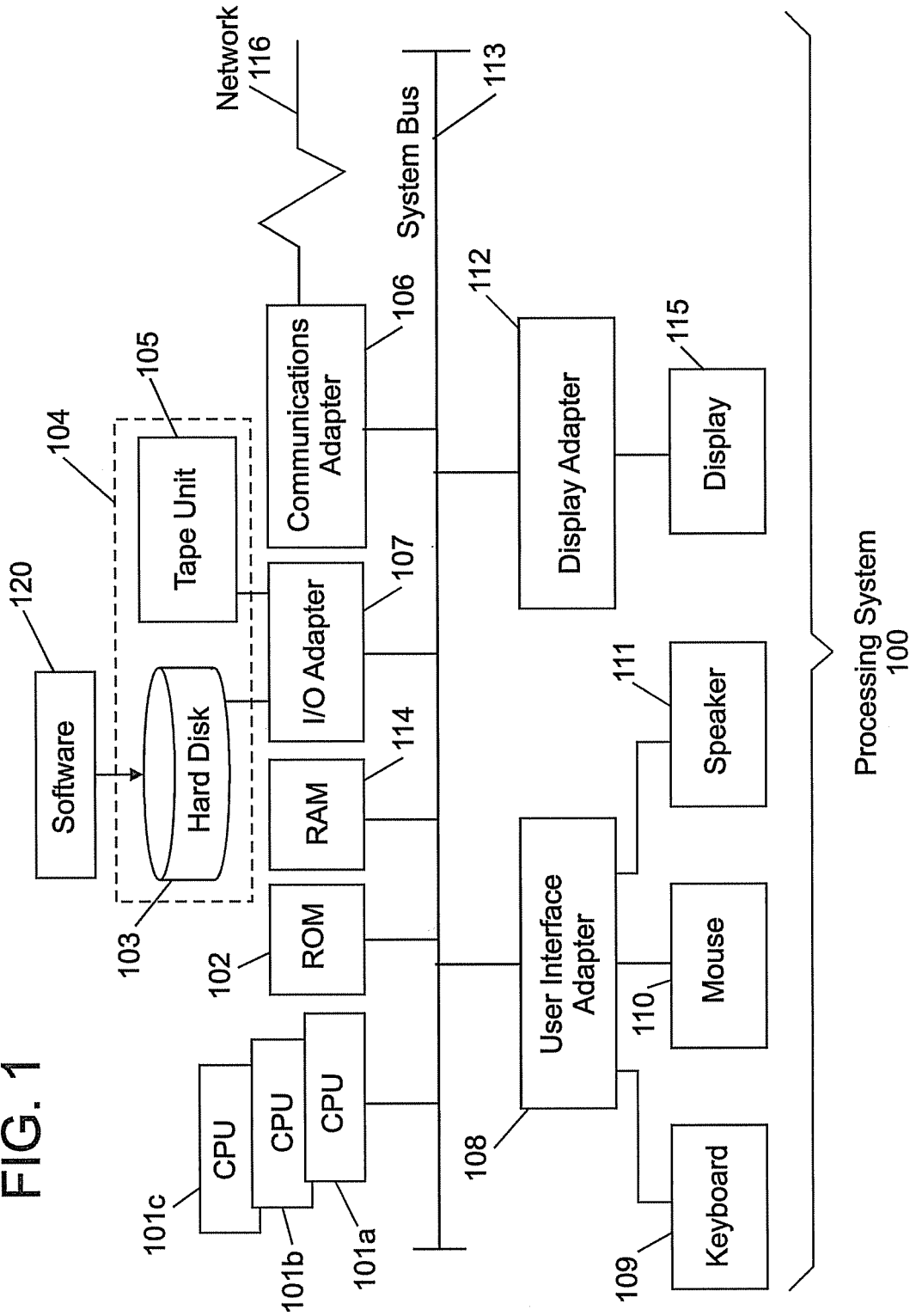
FIG. 1 illustrates an exemplary embodiment of a processing system for implementation of the teachings herein.

Referring to FIG. 1, there is shown an exemplary embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device.

Examples of operating systems that may be supported by the system 100 include WINDOWS 95, WINDOWS 98, WINDOWS NT 4.0, WINDOWS XP, WINDOWS 2000, WINDOWS CE, WINDOWS VISTA, MACINTOSH, JAVA, LINUX, and UNIX, or any other suitable operating system. The system 100 also includes a network interface 116 for communicating over a network. The network can be a local-area network (LAN), a metro-area network (MAN), or wide-area network (WAN), such as the Internet or World Wide Web.

Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine readable instructions stored on machine readable media (for example, the hard disk 104) for capture and interactive display of information shown on the screen 115 of a user. As discussed herein, the instructions are referred to as "software" 120. The software 120 may be produced using software development tools as are known in the art. Also discussed herein, the software 120 may also referred to as a "map display software" 120, or by other similar terms. The software 120 may include various tools and features for providing user interaction capabilities as are known in the art.

In some embodiments, the software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

The software 120 generally provides users with a capability to distort a map provided by a widget. Commands to distort the map are used with the browser. The commands are automatically executed by the browser to distort the map. The commands may be native to (written to function within) computer application code programs (for example, C, C++, PERL, JAVA, JAVASCRIPT and others), other programs typically regarded as computing environments (UNIX, LINUX, DOS, and others) as well as other types of programs.

In one embodiment, the software 120 may initially be placed on a server. In this embodiment, the processing system 100 can be a client of the server. The processing system 100 running the browser can receive the software 120 via the Internet by specifying a uniform resource locator (URL). In one embodiment, the processing system 100 will receive the software 120 that includes JAVASCRIPT and Hypertext Markup Language (HTML). The browser can then run the JAVASCRIPT that was received by the processing system 100.

As a matter of convention herein, it is considered that the "software" 120 provides for interfacing with other "computer code" used for presenting a map widget. It is recognized that computer code is commonly regarded as software, however, in the interest of avoiding confusion, use of the term "software" is generally limited to describing embodiments of computer implemented instructions and computer program products that provide for distorting a map presented by a map widget.

For some perspective on the map display software 120, consider the following. A map widget may be presented on the processing system 100 by an Internet browser such as MOZILLA FIREFOX® available from Mozilla Corporation of Mountain View, Calif. A map with markers associated with the map widget may be transformed by the map display software 120. The map display software 120 may be run on Firefox to transform the map and present the markers.

As used herein, the term "distorted" generally refers to a capability of the software 120 to transform the undistorted map into an "emphasized map." The term "transform" relates to deforming sections of the undistorted map and assembling the deformed sections to create the emphasized map. The terms "map" and "map image" relate to an image of a map displayed on the display 115 of the processing system 100. The term "weight factor" relates to a value or values that may be calculated using equations herein that include the term "weight".

Figure 2:
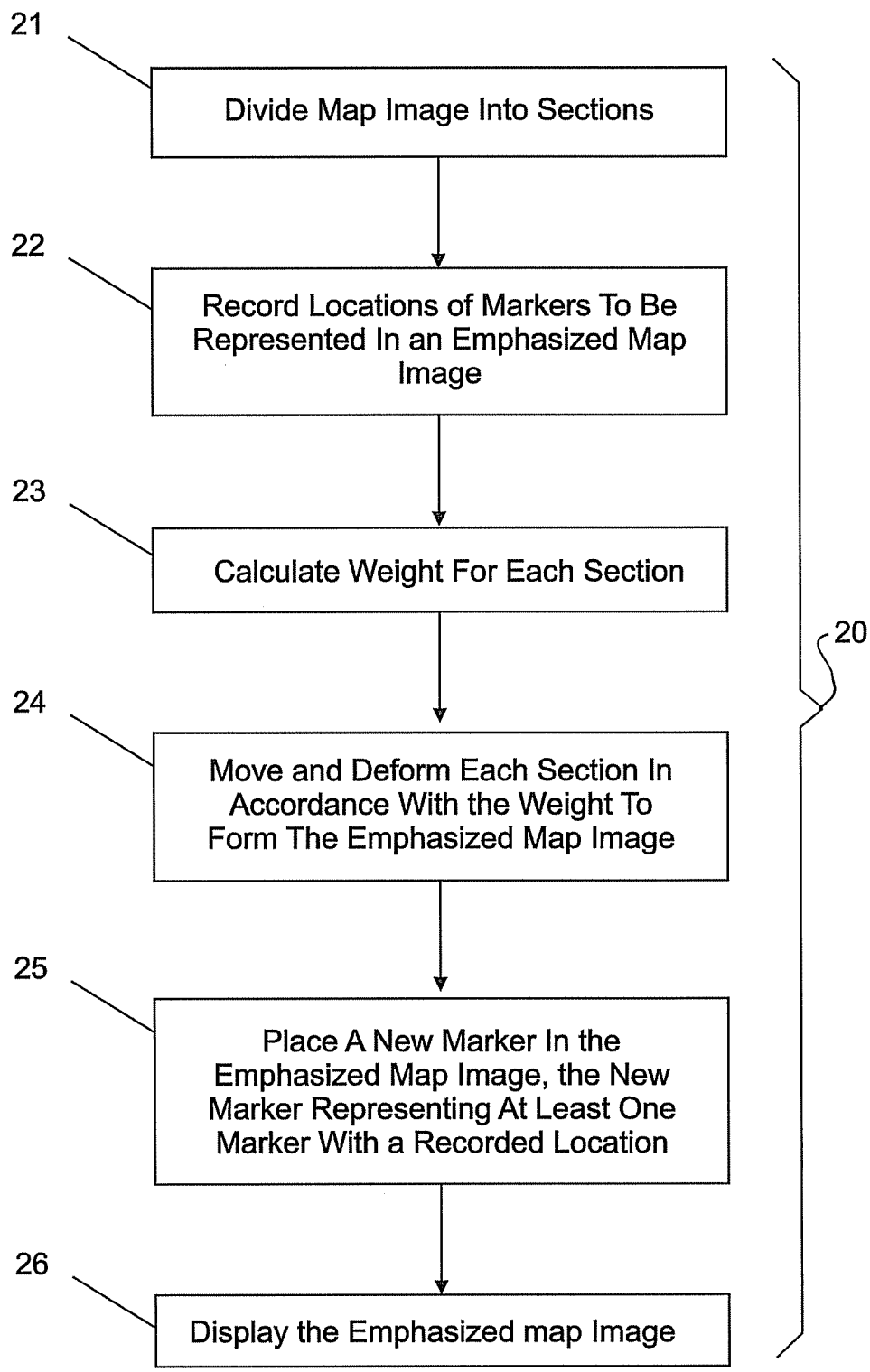
FIG. 2 presents one example of a method for displaying information on a map associated with a map widget.

FIG. 2 presents a method 20 for emphasizing an image of a map presented by a map widget on an Internet browser. The method 20 calls for (step 21) dividing the image into sections. Further, the method 20 calls for (step 22) recording locations of each marker to be represented in an emphasized map image on the display 115. Further, the method 20 calls for (step 23) calculating a weight for each of the sections. Further, the method 20 calls for (step 24) moving and deforming each section to form the emphasized map image. The moving and deforming are performed using the weight of each section as input. Further, the method 20 calls for (step 25) placing a new marker on the emphasized map image. The new marker represents at least one marker with a recorded location. Further, the method 20 calls for (step 26) displaying the emphasized map image. In one embodiment, the emphasized map image is displayed in place of the image of the map. In one embodiment, the image of the map and the emphasized map image may be displayed together.

Figure 3:
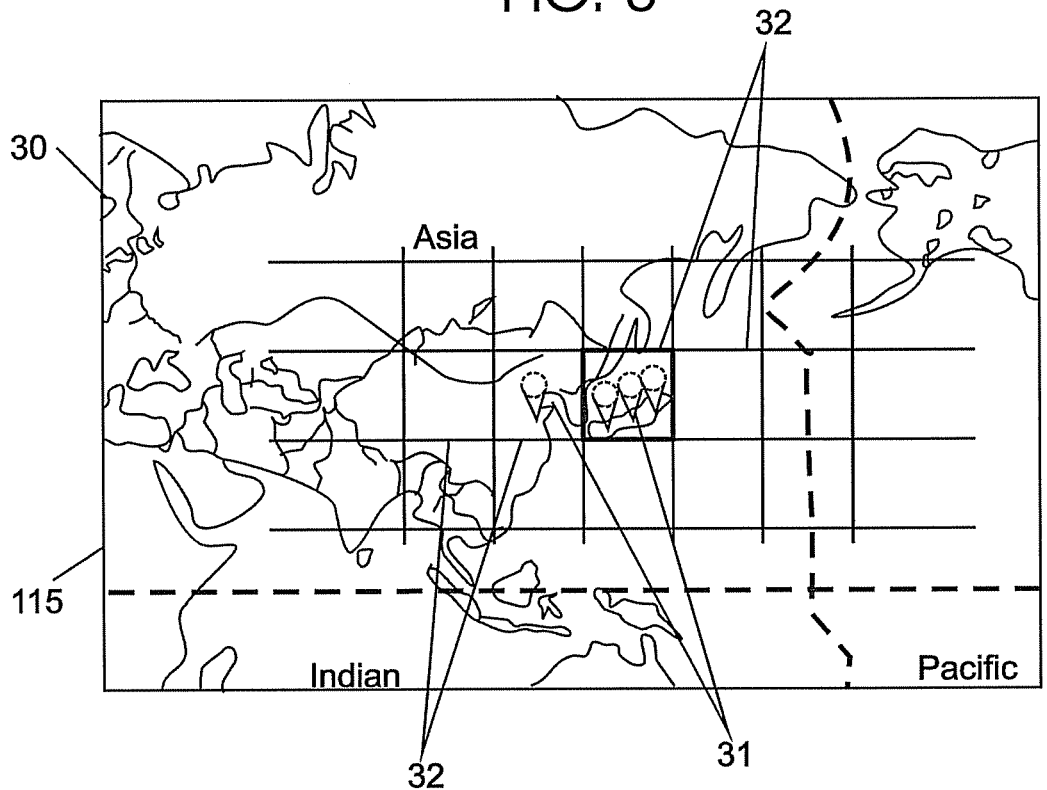
FIG. 3 illustrates one example of the map with markers associated with the map widget.

FIG. 3 presents an example of an image of an undistorted map 30 displayed on the display 115. The undistorted map 30 can be obtained from a map widget. The undistorted map 30 includes four markers 31. The four markers 31 in FIG. 3 are dotted to signify that in other examples the undistorted map 30 may not display any markers 31. Referring to FIG. 3, step 21 calls for dividing the undistorted map 30 into sections 32. In one embodiment, the map is divided using commands from JAVASCRIPT. One example of a JAVASCRIPT command used for dividing the undistorted map 20 is using the surface object provided by Dojo library. (Dojo is an Open Source Dynamic HTML toolkit written in JAVASCRIPT.) The surface object can hide the rest of the undistorted map 30. In one embodiment, a size of each of the sections 32 is selected so as not to include a large number of the markers 31. Each of the sections 32 can be identified by row and column coordinates, (r,c).

With respect to step 22, a map application programming interface (API) associated with the map widget may be used to record a location (latitude and longitude) for each of the markers 31 on the undistorted map 30. The map API may also be used to convert the geographical location for each marker 31 into a pixel position on the undistorted map 30.

Figure 4:
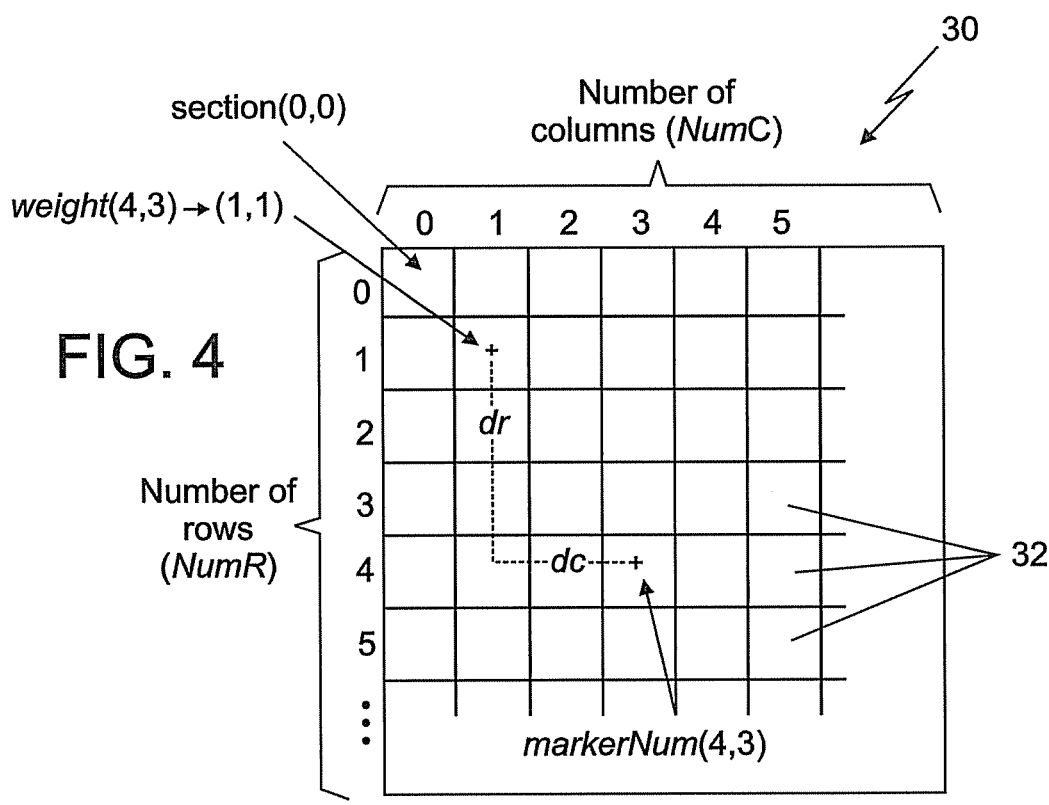
FIG. 4 illustrates one example of the map with details for determining a weight.

Referring to FIG. 4, in one embodiment the weight for each of the sections 32 is calculated using equation (1) as follows for (row', column') or (r',c') to (row, column) or (r,c):

$$weight_{(r',c') \to (r,c)} = \frac{markerNum(r, c)}{1 + A \times ((dc \times dc) + (dr \times dr))} \quad (1)$$

where A is a constant selected to express how much the weight in one section 31 will influence the weight in another section 32; dc represents the number of columns between c and c'; dr represents the number of rows between r and r'; and markerNum(r,c) represents the number of markers 31 in the section 32 identified by coordinates (r,c). Equation (1) represents the weight from position (r,c) to position (r',c'). In general, the section 32 with more markers 31 than another section 32 will have a greater weight than the other section 32. In addition, the section 32 adjacent to a section 32 with heavy weight will also have heavy weight.

Referring to FIG. 4, in one embodiment the cumulative weight from all sections 32 is calculated using equation (2) as follows:

$$weight(r, c) = \sum_{r'=0}^{NumR} \sum_{c'=0}^{NumC} weight_{(r',c') \to (r,c)} \quad (2)$$

where NumR represents a number of rows and NumC represents a number of columns.

Figure 5:
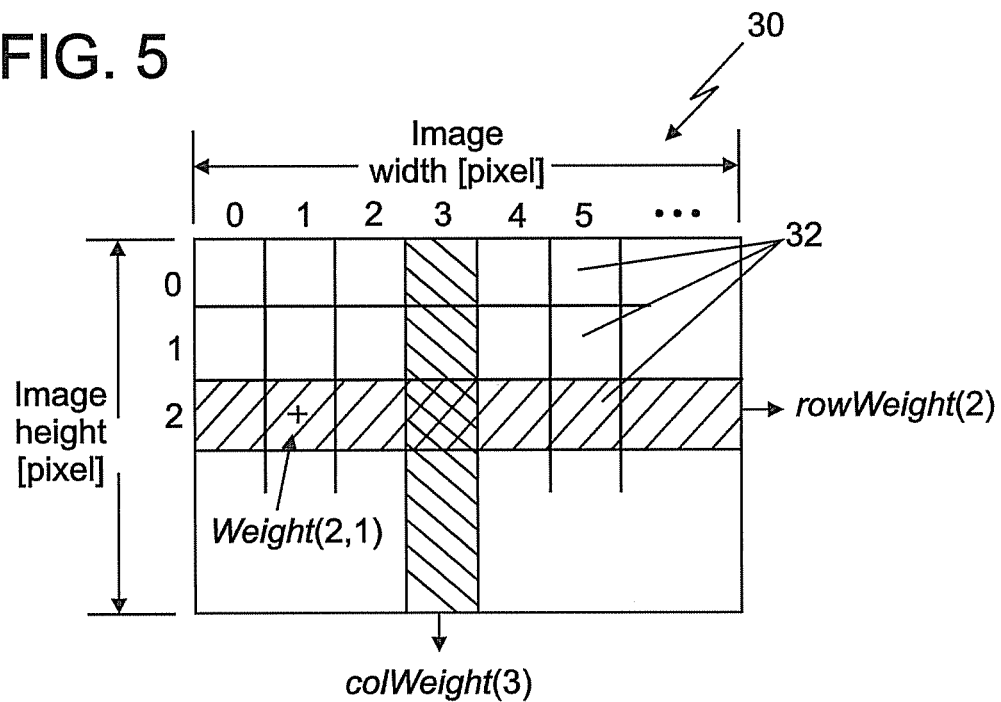
FIG. 5 illustrates one example of the map with details for determining a column weight and a row weight.

With respect to step 24 of method 20, in one embodiment each section 32 is moved and deformed in accordance with the weight of each section 32. To fit all sections 32 that are deformed into the emphasized map image of a given width and height, a column weight and a row weight are calculated. Referring to FIG. 5, in one embodiment equation (3) is used to calculate a row weight for sections 32 in row r.

$$rowWeight(r) = \sum_{c=0}^{NumC} weight(r, c) \quad (3)$$

Referring to FIG. 5, in one embodiment equation (4) is used to calculate a column weight for sections 32 in column c.

$$colWeight(c) = \sum_{r=0}^{NumR} weight(r, c) \quad (4)$$

An average row weight and an average column weight are calculated using equations (5) and (6) as follows:

$$avrRowWeight(r) = rowWeight(r)/NumC \quad (5)$$

$$avrColWeight(c) = colWeight(c)/NumR \quad (6)$$

Figure 6:
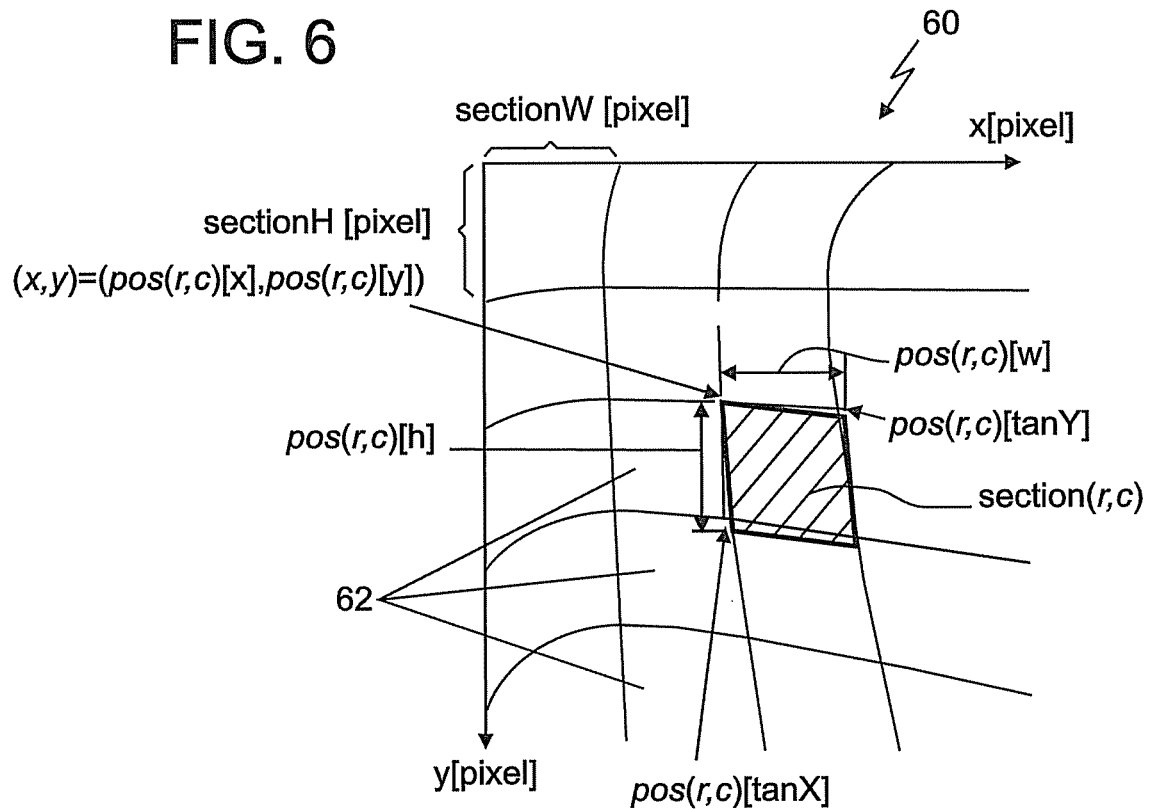
FIG. 6 illustrates an exemplary embodiment of an emphasized map.

Referring to FIG. 6, in one embodiment equations (7) through (14) are used to determine at least one of how each section 32 will be deformed and how each section 32 that is deformed will be located as follows:

$$pos(r,c)[x]=pos(r,c-1)[x]+pos(r,c-1)[w'] \quad (7)$$

where pos(r,c)[x] represents a pixel position in the "x" direction of the section 32 identified by row and column coordinates (r,c);

$$pos(r,c)[y]=pos(r-1,c)[y]+pos(r-1,c)[h'] \quad (8)$$

where pos(r,c)[y] represents a pixel position in the "y" direction of the section 32 identified by row and column (r,c);

$$pos(r,c)[h']=sectionH \times weight(r,c)/avrColWeight(c) \quad (9)$$

where sectionH is the pixel height of the section 32 identified by (r,c);

$$pos(r,c)[w']=sectionW \times weight(r,c)/avrRowWeight(r) \quad (10)$$

where sectionW is the pixel width of the section 32 identified by (r,c);

$$pos(r,c)[\tan X]=(pos(r+1,c)[x]-pos(r,c)[x])/pos(r,c)[h'] \quad (11)$$

where pos(r,c)[tan X] represents the gradient degrees in the "x" direction of the section 32 identified by (r,c);

$$pos(r,c)[\tan Y]=(pos(r+1,c)[y]-pos(r,c)[y])/pos(r,c)[w'] \quad (12)$$

where pos(r,c)[tan Y] represents the gradient degrees in the "y" direction of the section 32 identified by (r,c);

$$pos(r,c)[h]=(pos(r,c+1)[h']>pos(r,c)[h'])?$$
$$pos(r,c+1)[h']: pos(r,c)[h'] \quad (13)$$

where pos(r,c)[h] represents the height in pixels of the section 32 identified by (r,c); and $$pos(r,c)[w]=(pos(r+1,c)[w']>pos(r,c)[w'])?$$
$$pos(r+1,c)[w']: pos(r,c)[w'] \quad (14)$$

where pos(r,c)[w] represents the width in pixels of the section 32 identified by (r,c).

With respect to equation (13), pos(r,c)[h] uses the larger of pos(r,c)[h'] and pos(r,c+1)[h'] so that an adjacent section 32 can fill in a resulting gap. Similarly, with respect to equation (14), pos(r,c)[w] uses the larger of pos(r,c)[w'] and pos(r+1,c)[w'] so that an adjacent section 32 can fill in a resulting gap.

Referring to FIG. 6, applying the equations presented above to the undistorted map 30 and the sections 32 results in producing an emphasized map 60 with modified sections 62. The modified sections 62 result from deforming the sections 32.

Figure 7:
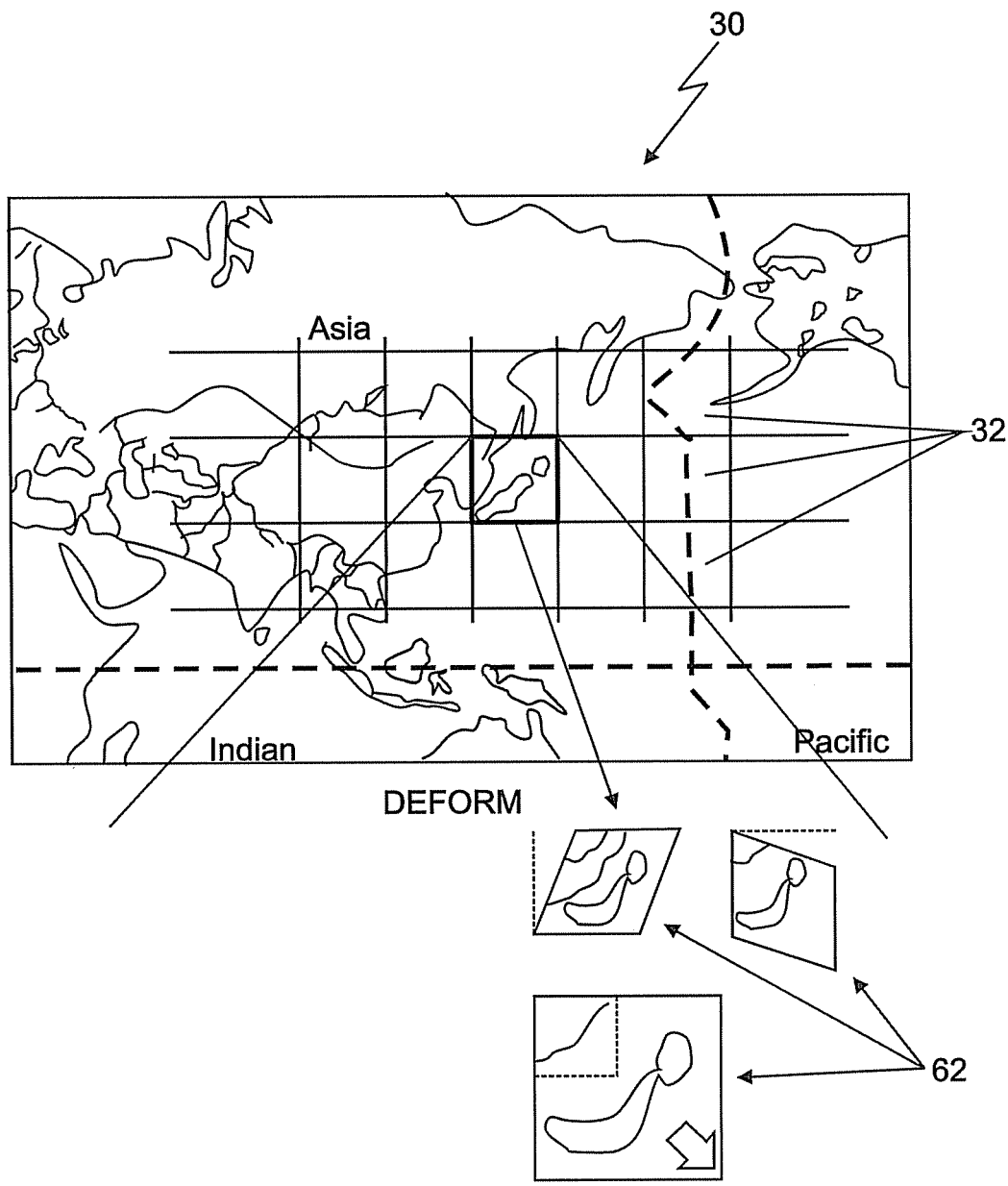
FIG. 7 illustrates aspects of deforming one section of the map.

FIG. 7 illustrates some examples of how one section 32 may be deformed to create one modified section 62 using the "gfx library" from Dojo.

Referring to FIG. 8, in one embodiment equations (13) and (14) are used to place the markers 31 on the modified sections 62 of the emphasized map 60 as follows:

$$markerX'=markerX \times (pos(r,c)[w]/sectionW) \quad (15)$$

where markerX' represents the number of pixels in the "x" direction from an origin (r,c) of the modified section 62, markerX represents the number of pixels in the "x" direction used to locate the marker 31 on the section 32, and sectionW represents the pixel width of the corresponding section 32; and $$markerY'=markerY \times (pos(r,c)[h]/sectionH) \quad (16)$$

where markerY' represents the number of pixels in the "y" direction from an origin (r,c) of the modified section 62, markerY represents the number of pixels in the "y" direction used to locate the marker 31 on the section 32, and sectionH represents the pixel height of the corresponding section 32.

Referring to FIG. 9, one example of computing the emphasized map 60 is presented as follows with the following conditions:

NumR=8;
NumC=16;
IMG_H=secH*NumR=256 [pixel];
IMG_W=secW*NumC=512 [pixel];
IMG_NAME="map.img";
A=1/16.

The code presented in this example is written in JAVASCRIPT.

The following code is used to select the section 32 for each marker 31:

```
for (var i in markers) {        (markers[i] represents each marker 31)
   markers[i]["c"] = parseInt(markers[i]["mapX"] / secW)
   markers[i]["r"] = parseInt(markers[i]["mapY"] / secH)
   where markers[i]["mapX"] and markers[i]["mapY"] are pixel location
given by the map API.
```

The following code is used to calculate the weight for each modified section 62:

```
for (var r = 0; r < NumR; r++) {
   for (var c = 0; c < NumC; c++) {
      var dC = c - markers[i]["c"];
      var dR = r - markers[i]["r"];
      weight[r][c] += 1 / (1 + A * (dC * dC + dR * dR));
   }
}
```

The following code is used to calculate the average row weight and the average column weight:

```
for(var r = 0; r < NumR; r++) {
   for(var c = 0; c < NumC; c++) {
      avrRowWeight[r] += weight[r][c] / NumC;
      avrColWeight[c] += weight[r][c] / NumR;
   }
}
```

The following code is used to calculate the positions of each section 32:

```
for(var r = 0; r < NumR; r++) {
   for(var c = 0; c < NumC; c++) {
      pos[r][c]["x"] = (0 == c)? 0 : (pos[r][c - 1]["x"] + pos[r][c - 1]["_w"]);
      pos[r][c]["y"] = (0 == r)? 0 : (pos[r - 1][c]["y"] + pos[r - 1][c]["_h"]);
      pos[r][c]["_h"] = secH * weight[r][c] / avrColWeight[c];
      pos[r][c]["_w"] = secW * weight[r][c] / avrRowWeight[r];
   }
}
```

```
for (var r = 0; r < unitNumR; r ++) {
    for (var c = 0; c < this.unitNumC; c ++) {
        pos[r][c]["tanX"] = (pos[r+1][c]["x"] – pos[r][c]["x"]) / (pos[r+1][c]["y"] –
        pos[r][c]["y"]);
        pos[r][c]["tanY"] = (pos[r][c+1]["y"] – pos[r][c]["y"]) / (pos[r][c+1]["x"] –
        pos[r][c]["x"]);
        var xx = (pos[r][c + 1]["x"] < pos[r + 1][c + 1]["x"])? pos[r + 1][c + 1]["x"] :
        pos[r][c + 1]["x"];
        var yy = (pos[r + 1][c]["y"] < pos[r + 1][c + 1]["y"])? pos[r + 1][c + 1]["y"] :
        pos[r + 1][c]["y"];
        pos[r][c]["height"] = yy – pos[r][c]["y"];
        pos[r][c]["width"] = xx – pos[r][c]["x"];
```

The following code is used to clip the source image (undistorted map 30):

```
var divGfx = document.createElement("DIV");
...
    divGfx.style.top = pos[r][c]["y"] + "px";
    divGfx.style.left = pos[r][c]["x"] + "px";
    divGfx.style.height = pos[r][c]["height"] + "px";
    divGfx.style.width = pos[r][c]["width"] + "px";
    var surface = dojo.gfx.createSurface(divGfx, pos[r][c]["width"],
pos[r][c]["height"]);   (create a surface object with gfx library from
Dojo to hide rest of image)
    var img = surface.createImage({width: IMG_W, height: IMG_H, src:
    IMG_NAME}); (Set the source image.)
```

The following code gives the parameters to fit the image to the right position:

```
    var dX = –c * secW;
    var dY = –r * secH;
    var ddSftC = 0 < pos[r][c]["tanX"]? –1 : 1;
    var dSkX = –r * secH * pos[r][c]["tanX"];
    var dSkY = –c * secW * pos[r][c]["tanY"];
    var ddLnC = dLnC – ddSftC * (NumC – 1);
    var dBkX = (ddSftC – ddLnC) * secW;
    var dSkBkY = (–ddLnC + 1) * secW * pos[r][c]["tanY"];
    var dSkBkX = dSkX – dSkBkY * pos[r][c]["tanX"];
```

In the following code, the numbers in parentheses correspond to the numbers on FIG. 9. This code is used to create a transformation array wherein each transformation is applied one after another. The transformations transform each section 32 to one modified section 62 using the gfx library:

```
    var transForm = [dojo.gfx.matrix.scale(pos[r][c]["width"]/ secW,
pos[r][c]["height"]/ secH), (1)
        dojo.gfx.matrix.translate(dBkX, dY), (2)
        dojo.gfx.matrix.translate(dSkBkX, dSkBkY), (3)
        dojo.gfx.matrix.skewX(Math.atan(pos[r][c]["tanX"])), (4)
        dojo.gfx.matrix.skewY(–Math.atan(pos[r][c]["tanY"])) (5)
    ];
```

The following code is used to apply the transformation array:

```
                img.setTransform(transForm);
            }
        }
```

Figure 10:
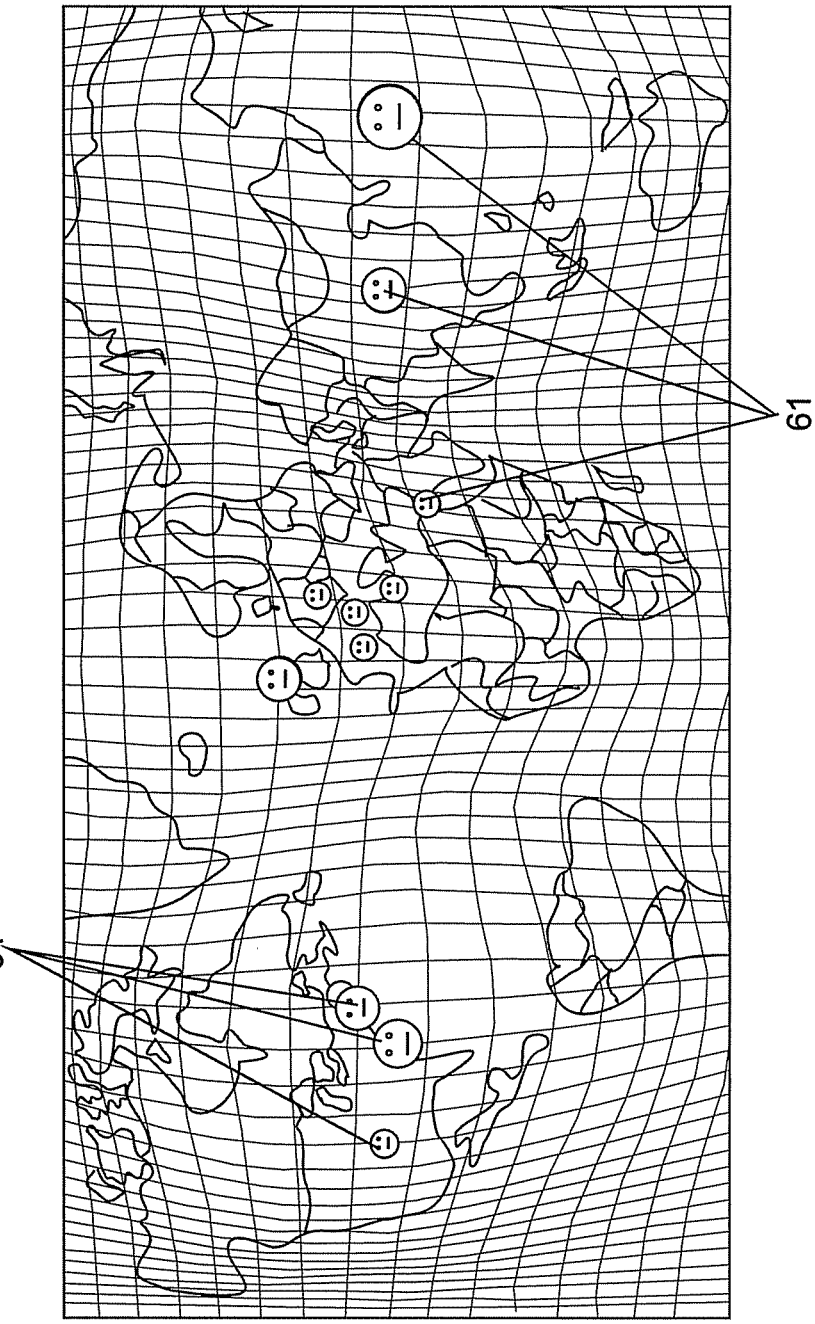
FIG. 10 illustrates one example of the emphasized map.

One example of the emphasized map 60 is illustrated in FIG. 10. Referring to FIG. 10, the emphasized map 60 includes new markers 61. The new markers 61 result from the markers 31 being placed on the emphasized map 60. In the embodiment of FIG. 10, the size of each new marker 61 is proportional to the number of markers 31 each new marker 61 represents.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

When introducing elements of the present invention or the embodiment(s) thereof, the articles "a," "an," and "the" are intended to mean that there are one or more of the elements. The terms "including" and "having" are intended to be inclusive such that there may be additional elements other than the listed elements.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for displaying an image of a map using a processing system, the method comprising:
   in response to receiving a first map image, dividing the first map image into a plurality of sections according to a grid wherein the first map image is displayed by the processing system;
   deforming, without manual interaction, each section in the plurality of sections according to a calculated weight factor associated with each of the sections to form a second map image;
   placing a new marker on the second map image wherein the new marker represents at least one marker with a recorded location; and wherein multiple sections that each comprise a location of at least one marker are expanded and at least one section that does not comprise a location of at least one marker is contracted.

2. The method as in claim 1, wherein a size of the new marker is proportional to the number of markers the new marker represents and a shape of the new marker is the same as the shape of other markers in the second map image.

3. The method as in claim 1, wherein the calculated weight factor for each section is proportional to the number of markers displayed in each section.

4. The method as in claim 1, wherein deforming comprises expanding each section in the plurality of sections that comprises at least one marker.

5. The method as in claim 4, wherein an amount of expansion for each section is related to the number of markers displayed in each section.

6. The method as in claim 1, wherein deforming comprises contracting at least one section in the plurality of sections that does not comprise at least one marker.

7. The method as in claim 1, wherein each deformed section in the plurality of sections is smoothly joined to an adjoining section such that joined boundary lines between each deformed section and an adjoining section have a continuous first derivative.

8. The method as in claim 1, wherein deforming comprises expanding multiple sections.

9. The method as in claim 8, wherein multiple sections adjacent to each other are expanded.

10. The method as in claim 8, wherein deforming further comprises contracting multiple sections that are adjacent to each other and not adjacent to a section that is expanded.

11. The method as in claim 8, wherein each section in the plurality of sections is deformed from the original shape in the grid.

12. A non-transitory computer readable medium comprising computer executable instructions for displaying an image of a map using a processing system by implementing a method comprising:

in response to receiving a first map image, dividing the first map image into a plurality of sections according to a grid wherein the first map image is displayed by the processing system;

deforming, without manual interaction, each section in the plurality of sections according to a calculated weight factor associated with each of the sections to form a second map;

placing a new marker on the second map image wherein the new marker represents at least one marker with a recorded location; and displaying the second map image in place of the first map image; and wherein multiple sections that each comprise a location of at least one marker are expanded and at least one section that does not comprise a location of at least one marker is contracted.

13. The medium as in claim 12, wherein a size of the new marker is proportional to a number of markers the new marker represents and a shape of the new marker is the same as the shape of other markers on the second map image.

14. The medium as in claim 12, wherein each deformed section in the plurality of sections is smoothly joined to an adjoining section such that joined boundary lines between each deformed section and an adjoining section have a continuous first derivative.

* * * * *